Feb. 14, 1950  F. M. APPLE  2,497,573
POWER LAWN MOWER
Filed Dec. 15, 1947  3 Sheets-Sheet 1

Floyd M. Apple
INVENTOR.

Feb. 14, 1950 — F. M. APPLE — 2,497,573
POWER LAWN MOWER
Filed Dec. 15, 1947 — 3 Sheets-Sheet 2

Floyd M. Apple
INVENTOR.

BY *[signatures]*
Attorneys

Feb. 14, 1950   F. M. APPLE   2,497,573
POWER LAWN MOWER
Filed Dec. 15, 1947   3 Sheets-Sheet 3
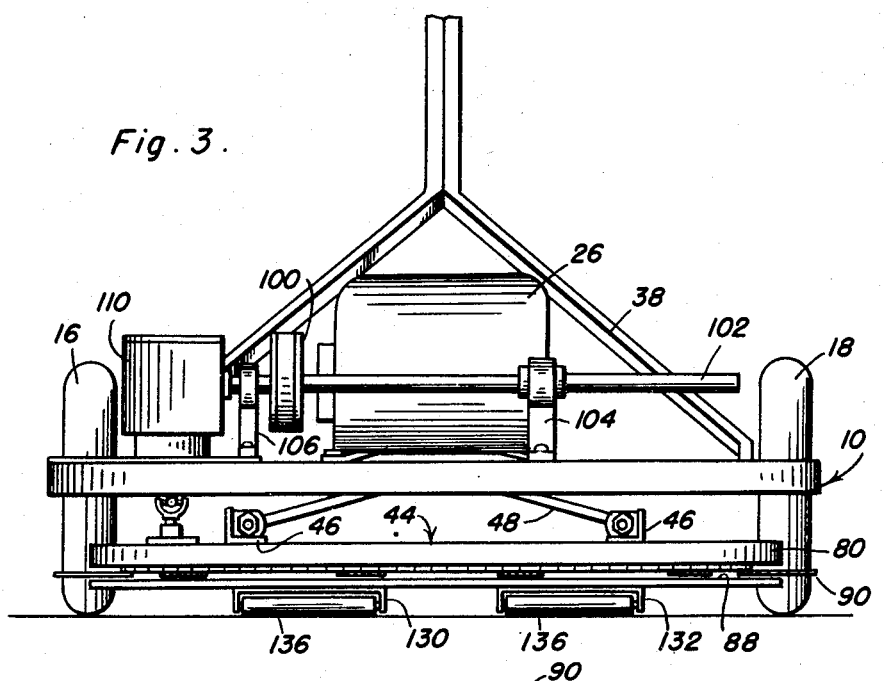
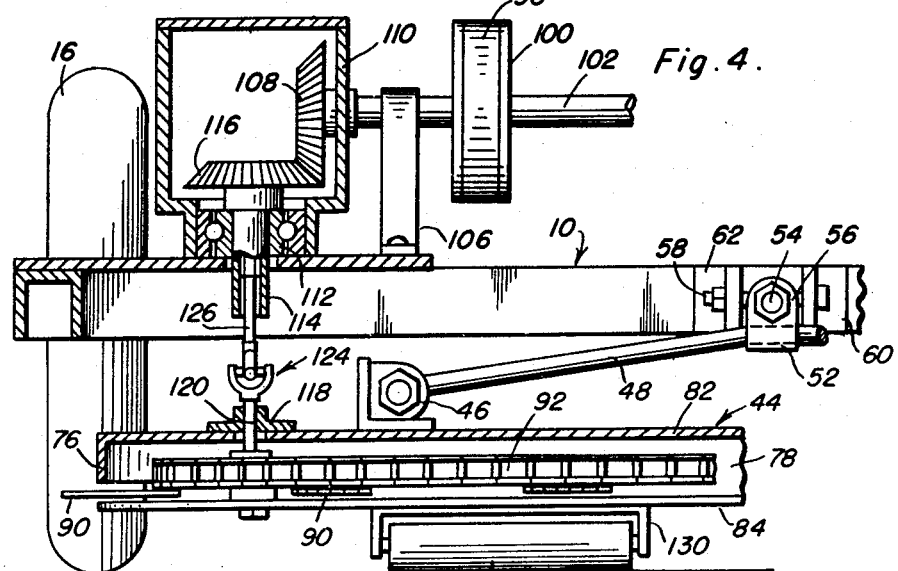
Floyd M. Apple
INVENTOR.

Patented Feb. 14, 1950

2,497,573

UNITED STATES PATENT OFFICE 2,497,573

POWER LAWN MOWER

Floyd M. Apple, Burlington, N. C.

Application December 15, 1947, Serial No. 791,720

4 Claims. (Cl. 56—25.4)

This invention appertains to novel and useful improvements in power driven lawn mowers.

An object of this invention is to actuate blades on an endless conveyor through the medium of a conventional source of power such as a motor, to swingingly support the blades and conveyor on a suitable frame.

Another object of this invention is to recess the wheels associated with a frame of a lawn mower in order that the wheels may not come into contact with the sides of a building, house, fence or the like.

Another purpose of this invention is to swingingly support a housing from the frame wherein the endless conveyor and blades are positioned.

A further purpose of this invention is to compensate for elevation and depression of the housing in the drive means for the blades.

Another object of this invention is to provide improved means for carrying out all of the above mentioned functions.

Another object of this invention is to provide a five-point suspension mower having a pivoted handle for manual locomotion and improved means for driving or actuating the cutter blades positioned on an endless conveyor.

Another purpose of this invention is to provide a device which is safe to actuate since the blades are recessed within the confines of the main frame member or support thereby obviating the possibility of inadvertently cutting or otherwise injuring a person's leg.

Ancillary objects and features of novelty will become apparent to those skilled in the art, in following the description of the preferred form of the invention, illustrated in the accompanying drawings, wherein:

Figure 3 is a front view of the invention shown in Figure 2;

Figure 4 is a sectional view taken substantially on the line 4—4 of Figure 1 and in the direction of the arrows;

Figure 1:
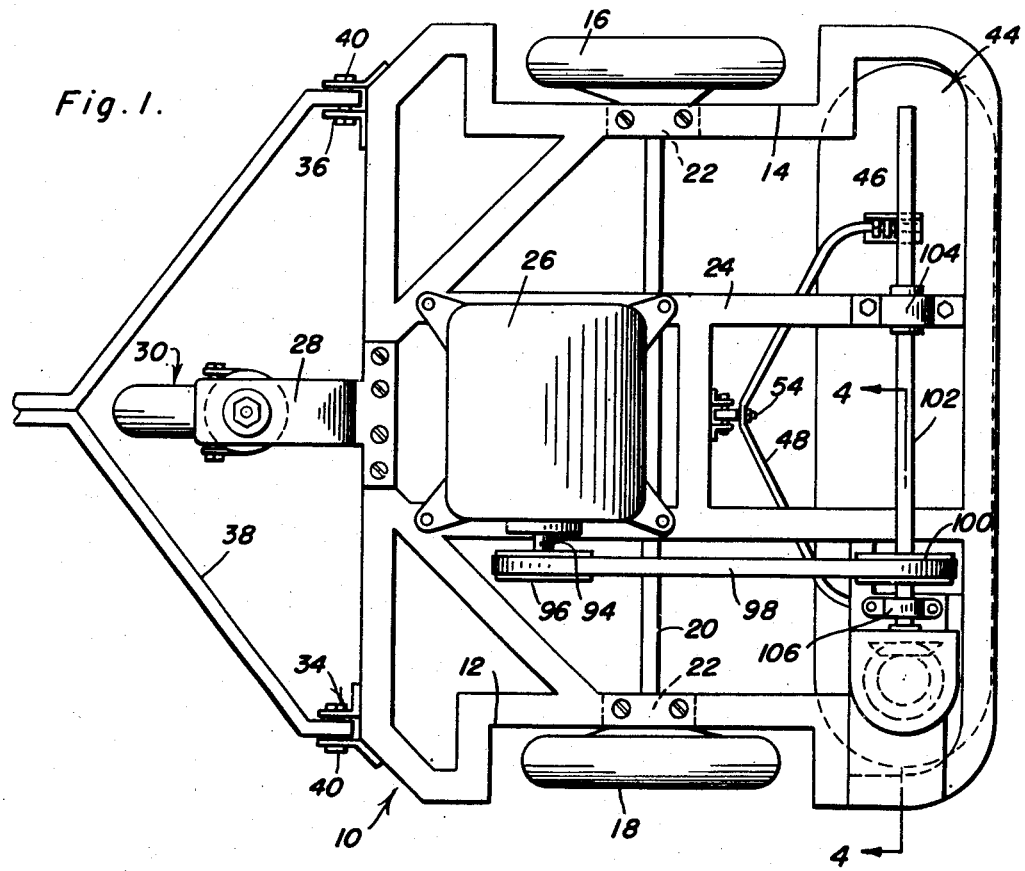
Figure 1 is a plan view of the preferred form of the invention.

This invention has been developed to provide a device for more efficaciously mowing lawns, cutting weeds, and otherwise performing cutting operations on flora.

An improved frame generally indicated at 10 is provided of many structural elements cooperating to form the said frame. Of course, the preferred material of construction of this frame is metallic and is of suitable strength to support the various appurtenances contiguous to the invention.

The said frame is provided with a pair of opposed recesses 12 and 14 respectively wherein wheels 16 and 18 are journalled. A suitable conventional shaft 20 is secured to the said frame 10 adjacent these recesses and any type of conventional bearings may be used for this journalling purpose. Of course, the bearings illustrated at 22 are conventional detachable split bearings which may have anti-friction or frictionless bearings associated therewith or in lieu thereof.

The leading edge of the said frame 10 is smoothly contoured at the edges and serves the purpose of a bumper. The central portion of the said frame is composed substantially of a plurality of struts formed in the shape of an H-frame. This H-frame 24 has a suitable motor means 26 positioned thereon. Of course, an electric motor or the like may be used in this connection and a cord may extend to a suitable source of power.

A bracket 28 is rigidly secured to the said frame 10 through the medium of screws or the like and is curved in order to properly accommodate a caster generally indicated at 30. It may now be appreciated that the motor means 26 is positioned within the triangular bed formed by the two wheels 16 and 18 and the caster 30. Through this medium, the center of mass of the frame and motor means is properly regulated.

A pair of identical bifurcated perches 34 and 36 respectively are secured to the said frame 10 and a yoke 38 has its legs pivotally associated therewith through the medium of conventional bolts or pivot pins 40. A suitable handle 42 is secured to the said yoke 38 for actuation of the mower. It will be noted at this point that the caster 30 is received between the yoke when the handle is lowered in its lowermost position in order to provide sufficient clearance. A housing 44 is supplied with a pair of identical, spaced brackets 46 having an arm 48 pivotally received in suitable apertures in each of the said brackets 46. This arm 48 is in actuality a yoke having its ends secured in the respective brackets 46. The center portion of the yoke (see Figure 4) may be positioned in a suitable sling 52, which sling is secured to an eye bolt 54, by means of a conventional nut 56. The enlarged portion of the said eye bolt is pivoted on a stub shaft or pivot pin 58 which is extended through a pair of brackets 60 and 62 respectively, rigidly secured to the cross member of the said H-frame 24.

It is now readily apparent that the housing 44 is capable of being raised and lowered relative to the frame and also being pivoted about the eye bolt as an axis.

Figure 5:
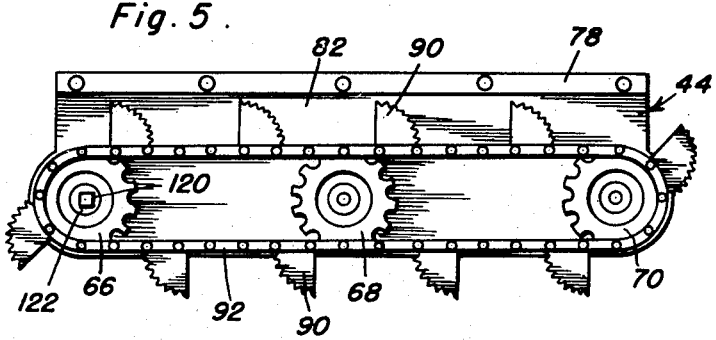
Figure 5 is a plan view of the endless conveyor, blades thereon, sprocket means for journalling the endless conveyor and housing therebeneath.
Figure 2:
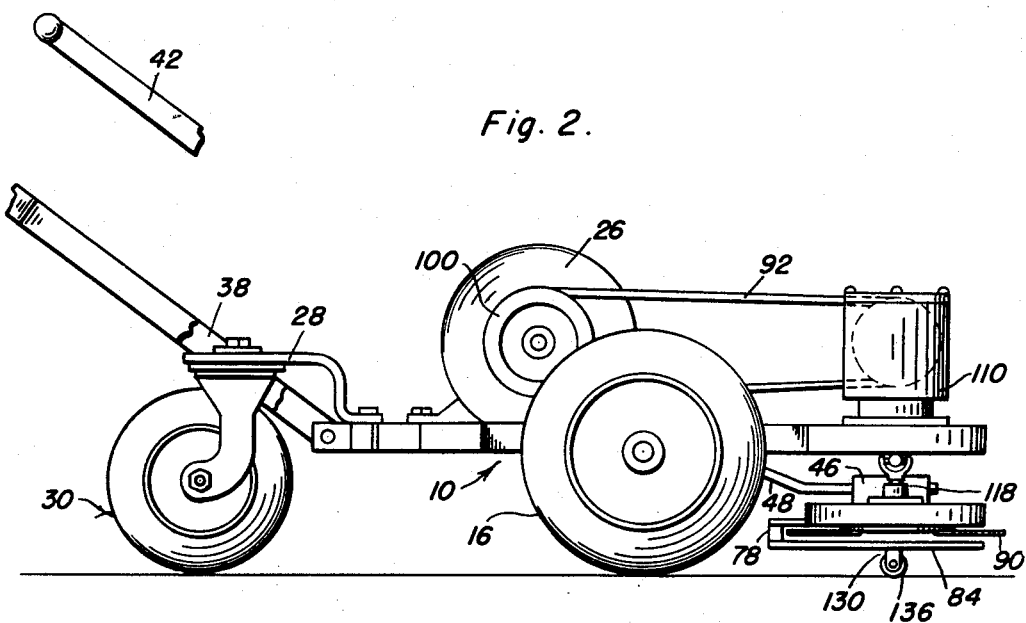
Figure 2 is a side view of the invention illustrated in Figure 1, the handle being broken away and illustrated as a continuation.
Figure 6:
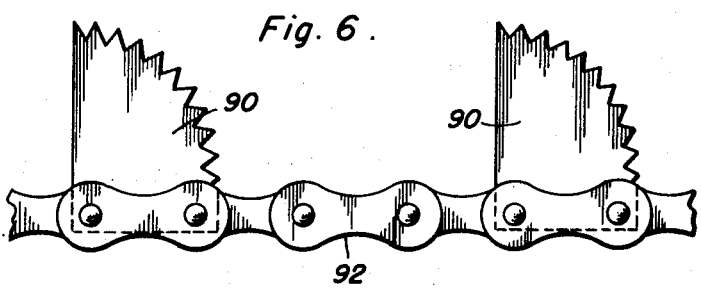
Figure 6 is an enlarged plan view of a portion of the endless conveyor and blades associated therewith.
Figure 7:
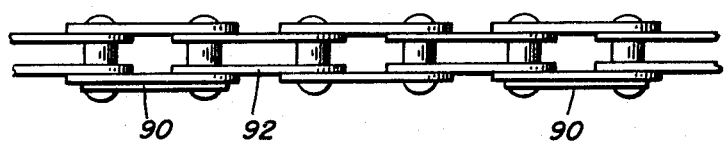
Figure 7 is a plan view of the detail of construction shown in Figure 6.

Improved means for cutting flora is provided in the said housing 24. Reference is made primarily to Figure 5 wherein this construction is illustrated most effectively. A drive sprocket 66, and a pair of idler sprockets 68 and 70 respectively are journalled in the said housing. It will be noted at this point that the specific structure of the said housing 44 is as follows. End walls 76 are provided with back and front walls 78 and 80 respectively secured to the upper and lower plates 82 and 84 respectively. An elongated slot 88 is provided in the front wall 80 for the purpose of receiving blades 90 therethrough. An endless conveyor, preferably a chain 92 extends around all of the said sprockets and has a plurality of blades 90 secured thereto at spaced intervals. The rear portion of the said housing 44 is sufficiently deep to accommodate the said blades 90 without having the blades projecting dangerously about and from the said housing at the rear portion thereof. The said blades 90, however, extend through the slot 88 to perform their cutting operations.

Means for actuating the endless conveyor 92 and therefore the said blades 90 is provided. This last mentioned means consists primarily of a power output shaft 94 associated with the motor means 26 and a pulley 96 rigidly secured to the said power output shaft. A belt 98 or any suitable equivalent drive means may be associated with the pulley 96 and a complemental pulley 100 is also entrained in this belt system.

A shaft 102 is suitably supported on said frame 10 through the medium of bearing bracket members 104 and 106 respectively which are secured to the said frame 10. A bevel gear 108 is supplied at the terminal of the said shaft 102 and is positioned within a suitable case 110. The cover of this case may be detachable if so desired and a suitable lubricant may be positioned therein.

A conventional frictionless bearing, preferably of the ball type, is indicated at 112 and is positioned within the said case 110. A shaft having a non-circular bore is indicated at 114 and is journalled in the inner race of the said frictionless bearing 112. The upper end of the said hollow shaft 114 retains a bevel gear 116 which is complemental to the said bevel gear 108 and is driven thereby.

A suitable boss 118 is applied on the upper plate 82 of the said housing 44 and has a non-circular rod 120 slidable therein. Their non-circular rod is also slidably received in a non-circular bore 122 in the center of the said driving sprocket 66. A universal joint 124 is associated with the other end of the said rod 120 and this universal joint also connects a link 126 therewith. The configuration of the said link 126 is also non-circular in order to conform with the bore of the said hollow shaft 114, wherein it is reciprocable.

In order to support the housing 44 while the mower is being actuated, a pair of perches 130 and 132 respectively are rigidly secured thereunderneath. Rollers 136 are journalled in each of the said perches through the medium of suitable conventional stub shafts.

In operation, the handle 42 is urged manually in order to locomote the frame 10. The motor means 26 actuates the said drive belt 48 or the like which in turn rotates the said shaft 102.

Upon rotation of the said shaft 102 the bevel gears 108 and 116 respectively will be actuated, thereby turning the hollow shaft 114. As the said hollow shaft 114 is turned, the link 126 and therefore the rod 120 is also rotatably actuated.

The rotative actuation of the said rod 120 in turn drives or actuates the driving sprocket 66 thereby moving the endless conveyor 92. The blades are projected from the said housing at the forward end thereof, through the slot 88. This action mows grass, weeds, flora and the like.

In the event that an obstacle is encountered, the sides of the said frame will strike the same rather than the said wheels 16 and 18. Also, the present invention's utility renders it possible to cut grass, weeds and the like a width equal to the width of the entire mower. There is no loss in this operation in that the blades reach a distance substantially as wide as the device itself.

While there has been described and illustrated but a preferred form of the invention, it is apparent that variations may be made without departing from the spirit thereof. Accordingly, limitation is sought only in accordance with the scope of the following claims.

Having described the invention, what is claimed as new is:

1. A power mower comprising a frame having opposed recesses in the sides thereof, wheels journalled in the recesses, a shaft journalled on said frame, means for motivating said shaft, a pin secured to said frame, an arm pivoted on said pin, a housing secured to said arm and ground engaging rollers secured to said housing, a flexible conveyor in said housing having blades secured thereto, means carried by said housing for journalling said conveyor, means for drivingly connecting said conveyor and said shaft, said connecting means including a hollow shaft rotatively secured to said frame, a link slidably positioned in said hollow shaft and drivingly connected therewith, means for connecting said link with said conveyor, said last mentioned means comprising a sprocket journalled in said housing having a non-circular aperture centrally thereof, a non-circular rod slidably positioned in said non-circular aperture, a universal joint connecting said link and said rod.

2. A power mower comprising a frame having wheels carried thereby, a shaft journalled on said frame, means for motivating said shaft, a pin secured to said frame, an arm pivoted on said pin, a housing secured to said arm and ground engaging rollers secured to said housing, a flexible conveyor in said housing having blades secured thereto, means carried by said housing for journalling said conveyor, means for drivingly connecting said conveyor and said shaft, a caster secured to said frame, and said caster, wheels and rollers forming a five point suspension.

3. In a power mower which includes a frame having wheels carried thereby, a housing having power operated blades mounted for movement therein, means carried by said frame for operating said blades, means for drivingly connecting said operating means and said blades, the improvement which comprises: means for attaching said housing to said frame and including a universal joint attached to said frame at substantially the center thereof, and an arm attached to said universal joint and said housing whereby said housing is attached to said frame for movement to compensate for depressions and rises on the ground.

4. A power mower comprising a frame which has wheels attached adjacent opposite sides thereof, a cutter, a housing supporting said cutter, means mounting said housing at the forward end of said frame for vertical movement independent of the movement of the frame including a pin attached to said frame at substantially the center of the frame, an arm pivoted intermediate its ends to said pin, the ends of said arm being attached to said housing by means of a pivotal connection.

FLOYD M. APPLE.

REFERENCES CITED

The following references are of record in the file of this patent:

UNITED STATES PATENTS

| Number | Name | Date |
|---|---|---|
| 334,304 | Sweeney et al. | Jan. 12, 1886 |
| 2,079,945 | Manning | May 11, 1937 |
| 2,186,126 | Roll | Jan. 9, 1940 |
| 2,188,110 | Fahnestock | Jan. 23, 1940 |